(12) United States Patent
Nishio et al.

(10) Patent No.: US 11,665,429 B2
(45) Date of Patent: May 30, 2023

(54) DISPLAY METHOD AND VIDEO RECORDING METHOD

(71) Applicant: FUJIFILM Corporation, Tokyo (JP)

(72) Inventors: Yuya Nishio, Saitama (JP); Tetsu Wada, Saitama (JP); Koichi Tanaka, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/704,416

(22) Filed: Mar. 25, 2022

(65) Prior Publication Data

US 2022/0217280 A1 Jul. 7, 2022

Related U.S. Application Data

(63) Continuation of application No. PCT/JP2020/028347, filed on Jul. 22, 2020.

(30) Foreign Application Priority Data

Sep. 27, 2019 (JP) .............................. JP2019-176631

(51) Int. Cl.
*H04N 5/232* (2006.01)

(52) U.S. Cl.
CPC ..... *H04N 5/23296* (2013.01); *H04N 5/23232* (2013.01)

(58) Field of Classification Search
CPC .. G09G 5/00; G09G 5/14; G09G 5/36; G09G 5/377; G09G 5/38; H04N 5/232; H04N 5/23232; H04N 5/23296
See application file for complete search history.

(56) References Cited

U.S. PATENT DOCUMENTS

| 2007/0046804 A1 | 3/2007 | Hirano et al. |
| 2010/0271485 A1 | 10/2010 | Kim |
| 2011/0019239 A1 | 1/2011 | Kojima et al. |

FOREIGN PATENT DOCUMENTS

| EP | 3 166 305 A1 | 5/2017 |
| JP | 2007-96588 A | 4/2007 |

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/028347, dated Apr. 7, 2022.

(Continued)

*Primary Examiner* — Antoinette T Spinks
(74) *Attorney, Agent, or Firm* — Birch, Stewart, Kolasch & Birch, LLP

(57) ABSTRACT

Provided are a display method and a video recording method for a user to perceive a position of an extraction range moving within an angle of view.
A display method according to an aspect of the present invention includes an acquisition step of acquiring a reference video that is a motion picture, an extraction step of extracting an extraction video set to be smaller than an angle of view of the reference video within the angle of view from the reference video, a movement step of moving an extraction range of the extraction video over time, a first display step of displaying the extraction video on a display device, and a second display step of displaying a support video based on a positional relationship between the angle of view and the extraction range on the display device, in which the second display step is executed during execution of the first display step.

20 Claims, 13 Drawing Sheets

(56) References Cited

FOREIGN PATENT DOCUMENTS

| | | |
|---|---|---|
| JP | 2011-50038 A | 3/2011 |
| JP | 2017-46355 A | 3/2017 |
| JP | 2019-22028 A | 2/2019 |

OTHER PUBLICATIONS

International Search Report (Form PCT/ISA/210) for International Application No. PCT/JP2020/028347, dated Oct. 20, 2020, with English translation.

<AT TIME OF SETTING>
· ASPECT RATIO
· COORDINATE POSITION
· NUMBER OF PIXELS
· OPERATION METHOD
· AREA RATIO

⋮

<AT TIME OF IMAGING>
· IMAGING TIME PERIOD
· EXPOSURE CONDITION
· f NUMBER OF LENS
· TIME PERIOD TO WHEN END OF ANGLE OF VIEW IS REACHED

⋮

DISPLAY METHOD AND VIDEO RECORDING METHOD

CROSS-REFERENCE TO RELATED APPLICATIONS

This application is a Continuation of PCT International Application No. PCT/JP2020/028347 filed on Jul. 22, 2020, which claims priority under 35 U.S.C. § 119(a) to Japanese Patent Application No. 2019-176631 filed on Sep. 27, 2019. The above application is hereby expressly incorporated by reference, in its entirety, into the present application.

BACKGROUND OF THE INVENTION

1. Field of the Invention

The present invention relates to a display method of displaying a video and a video recording method of recording a video.

2. Description of the Related Art

Among imaging apparatuses capturing videos, there is an imaging apparatus that extracts (cuts out) a video of a part of an angle of view of a captured video and displays the extraction video, such as imaging apparatuses disclosed in JP2017-46355A and JP2019-22026A.

The imaging apparatuses disclosed in JP2017-46355A and JP2019-22026A have a function of changing a position or the like of an extraction region within the angle of view at a predetermined speed. In a case where this function is used, for example, it is possible to track a subject in the video or cause an angle of a recorded video to slide in a certain direction without manually operating the imaging apparatuses during imaging.

SUMMARY OF THE INVENTION

In a case of displaying a video within an extraction range while moving the extraction range, it is required that a position of the extraction range within the angle of view can be checked so that a user can perceive which range within the angle of view is extracted.

However, in a display method of a video using the imaging apparatuses disclosed in JP2017-46355A and JP2019-22026A, while the video within the extraction range moving within the angle of view is displayed, it is difficult to perceive the position of the extraction range from only the displayed video.

The present invention is conceived in view of the above matter, and an object thereof is to resolve problems of the technology in the related art and provide a display method for causing a user to perceive a position of an extraction range moving within an angle of view, and a video recording method employing the display method.

In order to accomplish the above object, a display method according to an aspect of the present invention comprises an acquisition step of acquiring a reference video, an extraction step of extracting an extraction video set to be smaller than an angle of view of the reference video within the angle of view from the reference video, a movement step of moving an extraction range of the extraction video over time, a first display step of displaying the extraction video on a display device, and a second display step of displaying a support video based on a positional relationship between the angle of view and the extraction range on the display device, in which the second display step is executed during execution of the first display step.

According to the display method according to the aspect of the present invention, by displaying the support video based on the positional relationship between the angle of view and the extraction range during display of the extraction video, a user can perceive a position of the extraction range moving within the angle of view.

In addition, in the display method according to the aspect of the present invention, the support video may include the extraction video, and in the second display step, the support video in which a position of the extraction video in the support video is specified may be displayed.

in addition, the display method according to the aspect of the present invention may further comprise a third display step of displaying information related to at least one of the reference video or the extraction video on the display device. In this case, it is more preferable that the third display step is executed during execution of both of the first display step and the second display step.

In addition, in the display method according to the aspect of the present invention, in the first display step, the extraction video may be displayed in a state where a display size of the extraction video is changeable, and in the second display step, the support video may be displayed in a state where an aspect ratio of the support video and a display size of the support video are changeable.

In this case, in the first display step, the extraction video may be displayed in a state where the display size of the extraction video is changeable while an aspect ratio of the extraction video is constantly maintained, and in the second display step, the support video may be displayed in a state where the display size of the support video is changed in accordance with a change in display size of the extraction video.

Alternatively, in the display method, in the second display step, the support video indicating a video of a part of the reference video may be displayed in a state where the display size of the support video is changed while the aspect ratio of the support video is constantly maintained, in accordance with a change in display size of the extraction video.

In addition, in the display method according to the aspect of the present invention, the second display step may be executed in accordance with a display scheme selected by a user from a first display scheme and a second display scheme, in a case where the first display scheme is selected, in the second display step, the support video may be displayed in a state where an aspect ratio of the support video and a display size of the support video are changeable, and in a case where the second display scheme is selected, in the second display step, the support video indicating a video of a part of the reference video may be displayed in a state where the display size of the support video is changeable while the aspect ratio of the support video is constantly maintained.

In addition, the acquisition step may be an imaging step of capturing the reference video within the angle of view. In this case, in the imaging step, the reference video may be captured within the angle of view using an anamorphic lens, and in the first display step, the extraction video may be displayed by extending a size in a lateral direction of the angle of view using the anamorphic lens.

In addition, in the display method according to the aspect of the present invention, the movement step may be executed during execution of the imaging step, and in the movement step, at least one of a position, a size, a movement speed, or a movement direction of the extraction range may be changed based on an instruction of a user received during execution of the movement step.

In addition, in the display method according to the aspect of the present invention, in the movement step, the extraction range may be moved within the angle of view such that a subject of a tracking target set by a user enters within the extraction range.

In addition, the display device may include a first display device and a second display device that are devices separated from each other. In this case, the first display device may display the extraction video on the first display device, and the second display device may display the support video on the second display device.

In addition, the display method according to the aspect of the present invention may further comprise a third display step of displaying text information related to at least one of the reference video or the extraction video on the second display device. In this case, the third display step may be executed during execution of both of the first display step and the second display step, and in a case where a width and a height of the first display device are inverted during the first display step, the support video of which a width and a height are inverted may be displayed on the second display device in the second display step, and the text information of which a display orientation is maintained may be displayed on the second display device in the third display step.

In addition, the display method according to the aspect of the present invention may further comprise a determination step of determining whether or not a distance between an end of the angle of view and an end of the extraction range is less than a threshold value during execution of the movement step, and an alert step of issuing an alert to a user in a case where the distance is less than the threshold value.

In addition, according to an aspect of the present invention, it is possible to provide a video recording method employing the display method, the video recording method comprising a recording step of recording the extraction video on a recording medium.

In addition, the present invention provides an apparatus for video display including a processor configured to execute an acquisition step of acquiring a reference video, an extraction step of extracting an extraction video set to be smaller than an angle of view of the reference video within the angle of view from the reference video, a movement step of moving an extraction range of the extraction video over time, a first display step of displaying the extraction video on a display device, and a second display step of displaying a support video based on a positional relationship between the angle of view and the extraction range on the display device, in which the second display step is executed during execution of the first display step.

According to the display method and the video recording method according to the aspects of the present invention, the user can perceive the position of the extraction range moving within the angle of view.

BRIEF DESCRIPTION OF THE DRAWINGS

FIG. 10 is a descriptive diagram for information such as setting contents.

DESCRIPTION OF THE PREFERRED EMBODIMENTS

Hereinafter, preferred embodiments (a first embodiment to a fourth embodiment) of the present invention will be described in detail with reference to the appended drawings. The embodiments described below are merely an example for facilitating understanding of the present invention and do not limit the present invention. That is, the present invention may be changed or improved from the embodiments described below without departing from a gist thereof. In addition, the present invention includes equivalents thereof.

First Embodiment

Figure 1:
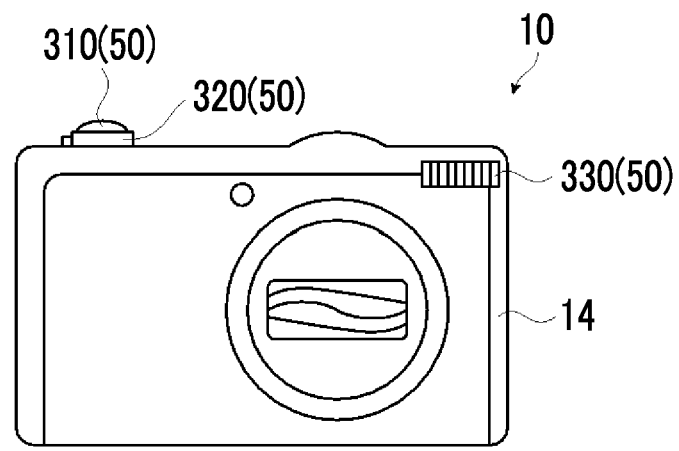
FIG. 1 is a diagram of an exterior of an imaging apparatus used in a display method according to a first embodiment of the present invention in a view from a front surface side.
Figure 2:
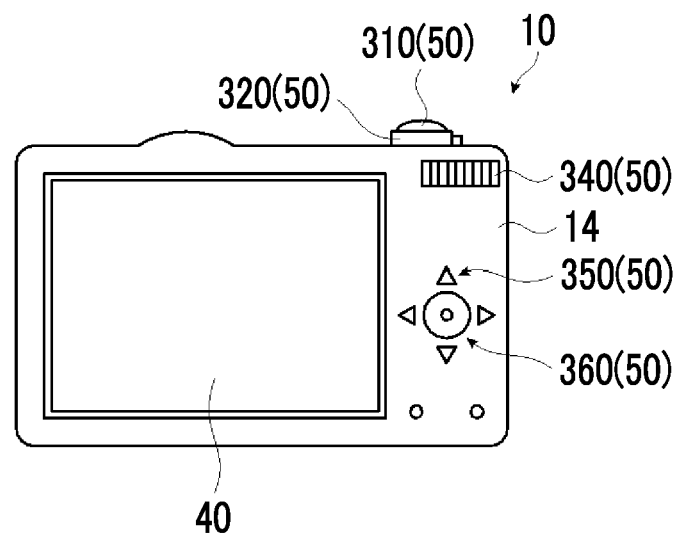
FIG. 2 is a diagram of the exterior of the imaging apparatus used in the display method. according to the first embodiment of the present invention in a view from a rear surface side.

The first embodiment of the present invention relates to a display method using an imaging apparatus 10 illustrated in FIGS. 1 and 2. That is, the display method according to the first embodiment of the present invention is implemented by the imaging apparatus 10.

Basic Configuration of Imaging Apparatus

A basic configuration of the imaging apparatus 10 will be described with reference to FIGS. 1 to 3.

The imaging apparatus 10 is a portable digital camera, has an exterior illustrated in FIGS. 1 and 2, and captures a still picture and a motion picture. In addition, the imaging apparatus 10 has functions of displaying a captured image (video) and recording the video. In the present specification, a function of capturing a video that is a motion picture in real time will be mainly described among functions of the imaging apparatus 10.

The imaging apparatus 10 is configured with an imaging apparatus main body 12 and a housing 14. The imaging apparatus main body 12 is a part of the imaging apparatus 10 excluding the housing 14. The housing 14 has approximately the same structure as a housing of a general digital camera and accommodates an imaging portion 20 and a control portion and the like including a controller 30 and a video processing portion 32 illustrated in FIG. 3.

Figure 3:
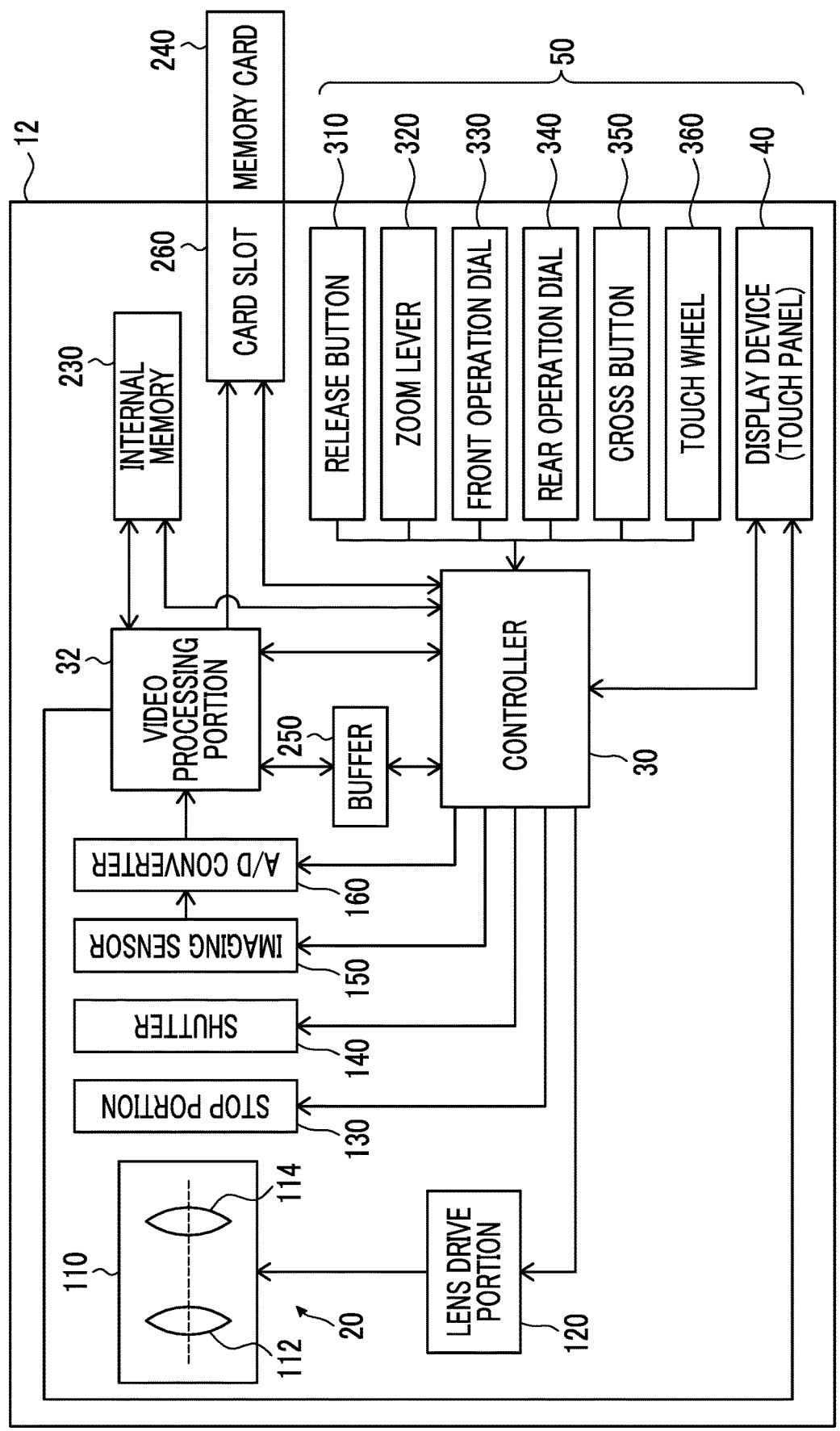
FIG. 3 is a diagram illustrating a configuration of an imaging apparatus main body comprised in the imaging apparatus used in the display method according to the first embodiment of the present invention.

The imaging portion 20 is a device capturing a video and includes a lens unit 110, a lens drive portion 120, a stop portion 130, a shutter 140, an imaging sensor 150, and an analog/digital (A/D) converter 160 as illustrated in FIG. 3.

The lens unit 110 includes a zoom lens 112 and a focus lens 114. In the first embodiment, the zoom lens 112 is equipped with an anamorphic lens. Thus, in the first embodiment, the video can be captured within an angle of view (for example, an angle of view having an aspect ratio of 2.35:1) that is wide in a lateral direction. The present invention is not limited to the anamorphic lens, and imaging lenses such as a wide angle lens, an ultra wide angle lens, and a 360-degree lens may be used. In addition, the lens unit 110 may be configured to be interchangeable with other lens units. In addition, the imaging portion 20 may comprise a plurality of lens units 110 having angles of view different from each other.

Here, the angle of view in capturing the video using the imaging portion 20 is decided in accordance with specifications and the like of the lens unit 110 and the imaging sensor 150, and the video captured within the angle of view corresponds to a "reference video" according to the embodiments of the present invention. An aspect ratio of the reference video is a value corresponding to the angle of view and is, for example, 2.35:1 in a case where the anamorphic lens is used.

The lens drive portion 120 is configured with a drive motor, not illustrated, and a drive mechanism, not illustrated, and moves the lenses of the lens unit 110 along an optical axis.

The stop portion 130 adjusts a size of an opening portion in accordance with setting of a user or automatically, and adjusts a quantity of light passing through the opening portion.

The shutter 140 blocks light transmitted to the imaging sensor 150.

The imaging sensor 150 is configured with, for example, a charged coupled device (CCD) or a complementary metal oxide semiconductor image sensor (CMOS), forms an image by receiving light from a subject through the lens unit 110, and generates image data. Specifically, the imaging sensor 150 converts a light signal received through a color filter into an electric signal using a light-receiving element, amplifies the electric signal using an auto gain controller (AGC), and generates analog image data from the signal after amplification.

The A/D converter 160 converts the analog image data generated by the imaging sensor 150 into digital image data. The digital image data corresponds to data of a frame image constituting the reference video that is a motion picture.

The number of pieces of pixel data (that is, the number of pixels) constituting the digital image data is not particularly limited. In the first embodiment, the number of pixels is greater than or equal to 10 million. Preferably, a lower limit of the number of pixels may be greater than or equal to 60 million. In addition, a preferred upper limit of the number of pixels in the first embodiment is less than or equal to 1 billion and more preferably less than or equal to 5 billion. In a case where the number of pixels is above the lower limit, visibility of an extraction video extracted from the reference video can be secured. In addition, in a case where the number of pixels is below the upper limit, a pixel information amount of the reference video can be further decreased. Thus, a speed of processing performed by the control portion (specifically, the video processing portion 32) is increased.

The controller 30 controls each portion of the imaging apparatus main body 12 in accordance with an operation of the user or automatically, and, for example, can cause the imaging portion 20 to capture (acquire) the reference video by controlling the imaging portion 20. In addition, the controller 30 can control the video processing portion 32 such that a video (specifically, the extraction video described later) is recorded on a recording medium. In addition, based on a contrast or the like of the entire or a part of an image indicated by the digital image data generated by the imaging portion 20, the controller 30 can control the lens drive portion 120 to set a focal point of the lens unit 110 to focus on the subject in the image. In addition, based on brightness of the entire or a part of the image indicated by the digital image data generated by the imaging portion 20, the controller 30 can control the stop portion 130 and automatically adjust an exposure amount at a time of imaging. In addition, the controller 30 can control the lens drive portion 120 to perform zooming (optical zooming) in accordance with the operation of the user or automatically in accordance with a distance between the subject and the imaging apparatus 10.

The video processing portion 32, under control of the controller 30, performs processing such as gamma correction, white balance correction, and defect correction on the digital image data generated by the imaging portion 20 and furthermore, compresses the processed digital image data in a compression format complying with a predetermined standard. The video processing portion 32 acquires the reference video from the compressed digital image data that is sequentially generated during imaging, and executes various processing on the acquired reference video. As an example of processing performed on the reference video, the video processing portion 32 can extract the extraction video (so-called cropped image) that is smaller than the angle of view within the angle of view of the imaging portion 20 from the reference video. In addition, the video processing portion 32 can change a size of a range (hereinafter, referred to as an extraction range) of the extraction video in order to perform zooming (electronic zooming) on a video of the subject within the extraction video. Here, the size of the extraction range is the number of pixels of the extraction video (in a strict sense, the number of pixels in each of a width and a height of the extraction video).

The control portion including the controller 30 and the video processing portion 32 consists of one or a plurality of microcontrollers or processors. Specifically, for example, the control portion is configured with a central processing unit (CPU) and a control program causing the CPU to execute various processing. The present invention is not limited thereto. The processor may be configured with a field programmable gate array (FPGA), a digital signal processor (DSP), an application specific integrated circuit (ASIC), a graphics processing unit (GPU), a micro-processing unit (MPU), or other integrated circuits (ICs), or may be configured with a combination thereof. In addition, as represented by a system on chip (SoC) or the like, the processor may be such that functions of the entire control portion including the controller 30 and the video processing portion 32 are configured with one integrated circuit (IC) chip. Furthermore, a hardware configuration of each processor above may be implemented by an electric circuit (circuitry) in which circuit elements such as semiconductor elements are combined.

The housing 14 further accommodates an internal memory 230 incorporated in the imaging apparatus main body 12, a memory card 240 that is attachable to and detachable from the imaging apparatus main body 12 through a card slot 260, and a buffer 250. The internal memory 230 and the memory card 240 are the recording medium on which the extraction video is recorded, and are configured with a flash memory, a ferroelectric memory, and the like. The buffer 250 functions as a work memory of the controller 30 and the video processing portion 32 and is configured with, for example, a dynamic random access memory (DRAM) or a ferroelectric memory. In addition, the buffer 250 stores various setting contents, imaging conditions, and the like.

The recording medium does not need to be disposed inside the imaging apparatus main body 12 and may be an external recording medium connected to the imaging apparatus main body 12 via the Internet. In addition, the recording medium may be connected to the imaging apparatus main body 12 through a cable such as a universal serial bus (USB) cable or a High-Definition Multimedia interface (HDMI) (registered trademark), or wirelessly.

A display device 40 is attached to a rear surface of the housing 14 as illustrated in FIG. 2. The display device 40 is configured with a liquid crystal display (LCD), an organic electroluminescence (EL) display, a light emitting diode (LED) display, at electronic paper, or the like. The display device 40 displays various videos including the extraction video and also displays an operation screen for setting of the imaging conditions and the like and mode selection.

In the first embodiment, an aspect ratio of a screen of the display device 40 is different from the aspect ratio of the angle of view and is, for example, 4:3 or 16:9. The screen of the display device 40 has a smaller value corresponding to a width/height than the angle of view.

The housing 14 comprises an operating part 50. The user performs various operations related to imaging through the operating part 50. For example, as illustrated in FIGS. 1 and 2, the operating part 50 includes a release button 310, a zoom lever 320, a front operation dial 330, a rear operation dial 340, a cross button 350, and a touch wheel 360 arranged on the housing 14. In a case where these devices are operated by the user, the devices transmit various control signals toward the controller 30. For example, in a case where the zoom lever 320 is operated, a control signal for changing a zoom magnification is transmitted toward the controller 30 in accordance with the operation. The controller 30 controls the lens drive portion 120 in order to move the zoom lens 112 in accordance with the control signal.

Figure 6:
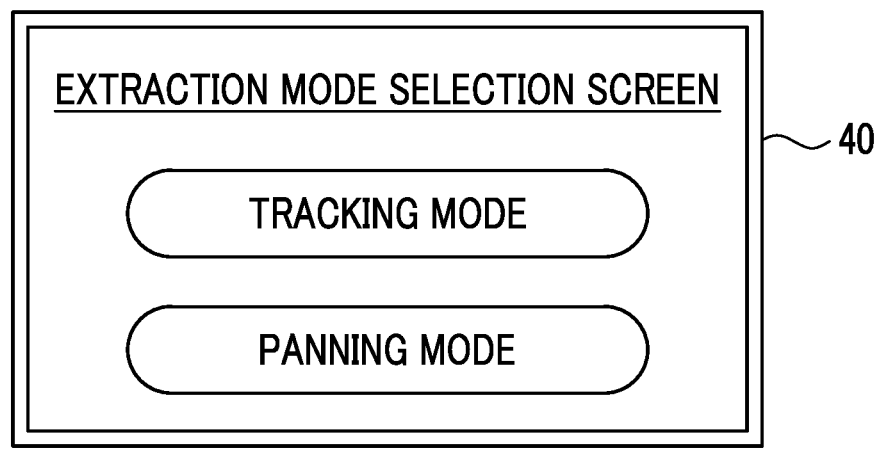
FIG. 6 is a diagram illustrating an extraction mode selection screen.

In addition, in the first embodiment, the display device 40 is a touch panel display and doubles as the operating part 50. In a case where the user touches the screen of the display device 40, a control signal corresponding to the touched position is transmitted toward the controller 30. For example, an extraction mode selection screen (refer to FIG. 6) described later is displayed on the display device 40. The user selects one of a plurality of modes and touches one corresponding button of a plurality of mode selection buttons drawn on the screen. Consequently, a control signal for setting the selected mode is transmitted toward the controller 30. The user can instruct the control portion to perform zooming processing or shutter processing (imaging processing) by touching the screen of the display device 40.

Screen Example of Display Device During Imaging

Next, a screen example displayed on the display device 40 during imaging in the first embodiment will be described with reference to FIG. 4.

In the first embodiment, the screen of the display device 40 is divided into three regions during imaging. As illustrated in FIG. 4, an extraction video P1, a support video P2, and information IF such as the setting contents are displayed in a first region, a second region, and a third region, respectively, at the same time.

Hereinafter, each of the extraction video P1, the support video P2, and the information IF such as the setting contents will be described in detail.

Extraction Video

Figure 5:
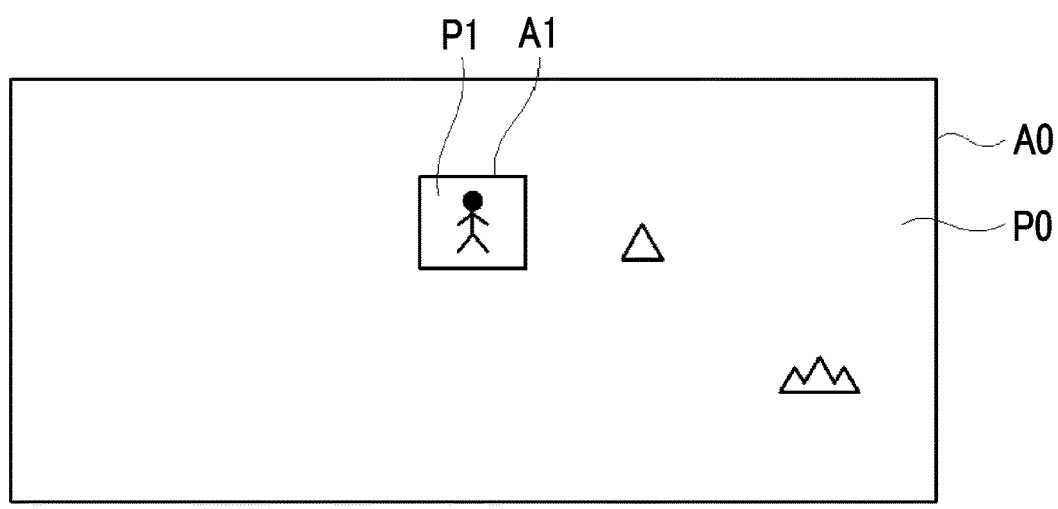
FIG. 5 is a descriptive diagram for an extraction video.

As illustrated in FIG. 5, the extraction video P1 is a video that is set to be smaller than an angle of view A0 of a reference video P0 within the angle of view A0, and is extracted (cut out) from the reference video P0.

In the first embodiment, the reference video P0 is a high image quality video consisting of 10 million or more (preferably, 60 million or more) pixels. Thus, the extraction video P1 extracted from the reference video P0 is also a video having sufficiently high image quality.

In the first embodiment, outer edges of the extraction video P1 have an oblong shape. However, the shape of the outer edges of the extraction video P1 is not particularly limited and may be a square shape, a parallelogramic shape, a trapezoidal shape, a rhombic shape, a circular shape or an elliptical shape, a triangular shape or a polygonal shape of a pentagonal or higher-faceted shape, or an indefinite shape.

The extraction video P1 is extracted from the reference video P0 by the video processing portion 32 as needed during imaging and is displayed in the first region on the screen of the display device 40 by the video processing portion 32. At this point, the extraction video P1 is displayed in a state where a display size can be changed to fall within the first region while the aspect ratio is maintained. In a case of performing imaging using the anamorphic lens, the extraction video P1 is displayed by extending the size in a lateral direction of the angle of view A0 in a case of using the anamorphic lens. A reason for doing so is because an image size is temporarily compressed in the lateral direction of the angle of view A0 at a point in time of image forming by the imaging sensor 150, and the display size is to be restored to an original size in a case of displaying the extraction video P1.

Figure 4:
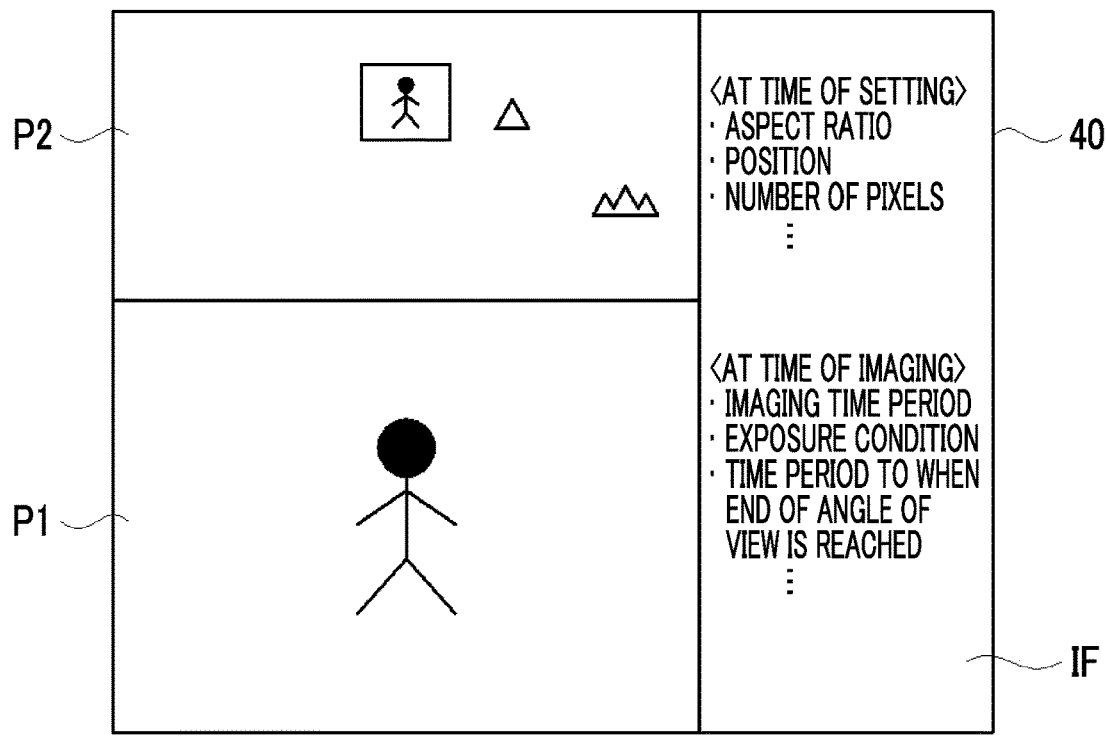
FIG. 4 is a diagram illustrating a screen example displayed on a display device during imaging in the first embodiment of the present invention.

In the screen example illustrated in FIG. 4, the extraction video P1 is displayed in a region positioned lowest on the screen of the display device 40. However, the present invention is not limited thereto. For example, the extraction video P1 may be displayed in a region positioned on the uppermost side or a region at the center on the screen of the display device 40.

In addition, during imaging, a range of the extraction video P1 within the angle of view A0, that is, an extraction range A1, can be moved over time within the angle of view A0. Here, "moving over time" means moving the extraction range A1 relative to the angle of view A0 such that a position of the extraction range A1 gradually changes, and may include a case where movement is stopped (paused) in the middle of imaging.

Movement of the extraction range A1 over time is implemented by the video processing portion 32. Specifically, in a case where the user selects one mode through the extraction mode selection screen illustrated in FIG. 6, the video processing portion 32 moves the extraction range A1 within the angle of view A0 along a movement path corresponding to the selected mode.

More specifically, in the first embodiment, two types of extraction modes are prepared. One mode is a mode (hereinafter, referred to as a tracking mode) in which the extraction range A1 is moved to track a subject of a tracking target. The other mode is a mode (hereinafter, referred to as a panning, mode) in which the extraction range A1 is moved in a certain direction.

Figure 7:
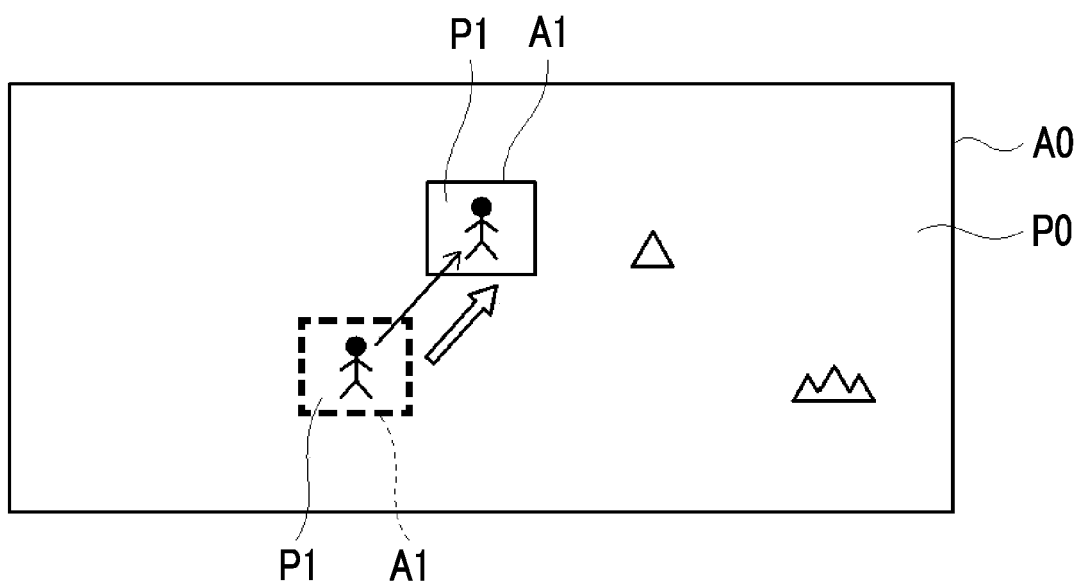
FIG. 7 is a diagram illustrating a movement path of an extraction range in a tracking mode.

In a case where the tracking mode is selected, the video processing portion 32 moves the extraction range A1 to track the subject of the tracking target, in this procedure, in a case where the tracking mode is selected, the user designates the video of the subject within the extraction video P1 by, for example, touching on the screen. The video processing portion 32 sets the subject designated by the user as the tracking target. Then, the video processing portion 32 moves the extraction range A1 such that the subject of the tracking target falls within the extraction range A1 as illustrated in FIG. 7.

As described above, in a case where the tracking mode is selected, the extraction video P1 in which the subject of the tracking target is captured can be displayed on the display device 40 at all times as long as the subject of the tracking target is present within the angle of view A0. In addition, the user does not need to move the imaging apparatus 10 in order to track the subject. Thus, the angle of view is not manually changed, and distortion (blurred video or the like) of the video occurring due to manual changing of the angle of view can be avoided. This effect is particularly effective in a case of performing imaging within the angle of view using the anamorphic lens.

An algorithm for searching for the subject of the tracking target within the angle of view A0 is not particularly limited. For example, an image of the subject set as the tracking target may be stored in the buffer 250 as a template image, and the template image is compared with the reference video P0 by applying a well-known template matching technology. As a result of comparison, a video of a part matching with the template image may be specified as the video of the subject of the tracking target.

Figure 8:
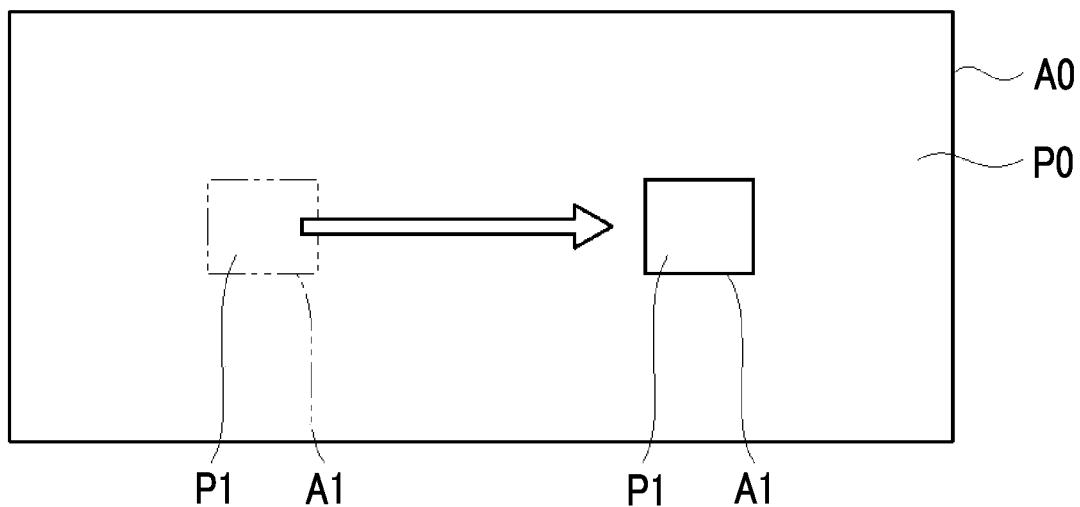
FIG. 8 is a diagram illustrating the movement path of the extraction range in a panning mode.

In a case where the panning mode is selected, the video processing portion 32 causes the extraction range A1 to slide, that is, pan, in a certain direction (for example, the lateral direction of the angle of view A0). In this procedure, in a case where the panning mode is selected, the user sets a starting position, a movement direction, a movement speed, and the like of the extraction range A1 on a setting screen not illustrated. Then, as illustrated in FIG. 8, the video processing portion 32 causes the extraction range A1 to automatically pan in the set direction from the set starting position at the set speed.

As described above, in a case where the panning mode is selected, a video of which an imaging angle is continuously changed in a certain direction, that is, a panoramic video, can be displayed on the display device 40. In addition, the user does not need to move the imaging apparatus 10 in order to change the angle. Thus, the angle of view is not manually changed, and distortion (blurred video or the like) of the video occurring due to manual changing of the angle of view can be avoided. This effect is particularly effective in a case of performing imaging within the angle of view using the anamorphic lens.

Setting items such as a size, an aspect ratio, an area ratio, and a movement speed during movement related to the extraction range A1 employ initially set contents. Alternatively, the user can set the setting items to any contents on the setting screen not illustrated. The aspect ratio of the extraction range A1 is an aspect ratio of the extraction video P1 and is, in a strict sense, a ratio of the number of pixels in each of the width and the height. The area ratio of the extraction range A1 is a ratio of an area. of the extraction range A1 to the angle of view A0. In a case where the angle of view A0 is divided in units of pixels, the movement speed of the extraction range A1 is the number of pixels through which the moving extraction range A1 passes within a unit time period.

In addition, in the first embodiment, an instruction issued by the user can be received through the operating part 50 during movement of the extraction range A1, and the size, the movement speed, the movement direction, the position during movement, and the like of the extraction range A1 can be changed based on the instruction. For example, the size may be changeable by operating the front operation dial 330, and the movement speed may be changeable by operating the rear operation dial 340. In addition, the movement direction may be changeable by operating the cross button 350, and the position during movement may be changeable using the touch panel of the display device 40. In this case, the user can change various setting contents related to the extraction range A1 intuitively in real time in accordance with a situation during movement of the extraction range A1.

Devices operated in a case of changing the setting contents of the extraction range A1 are not limited to the above correspondence relationship. For example, the size of the extraction range A1 may be changed based on an operation of the touch wheel 360.

Support Video

The support video P2 is a video based on a positional relationship between the angle of view A0 and the extraction range A1 during imaging and is displayed in order for the user to perceive the position of the extraction range A1 within the angle of view A0 during imaging. The support video P2 is displayed on the display device 40 by the video processing portion 32. Specifically, the video processing portion 32 recognizes the position, the size, and the like of the extraction range A1 during imaging, generates the support video P2 based on these information, and displays the support video P2 on the display device 40.

Figure 9:
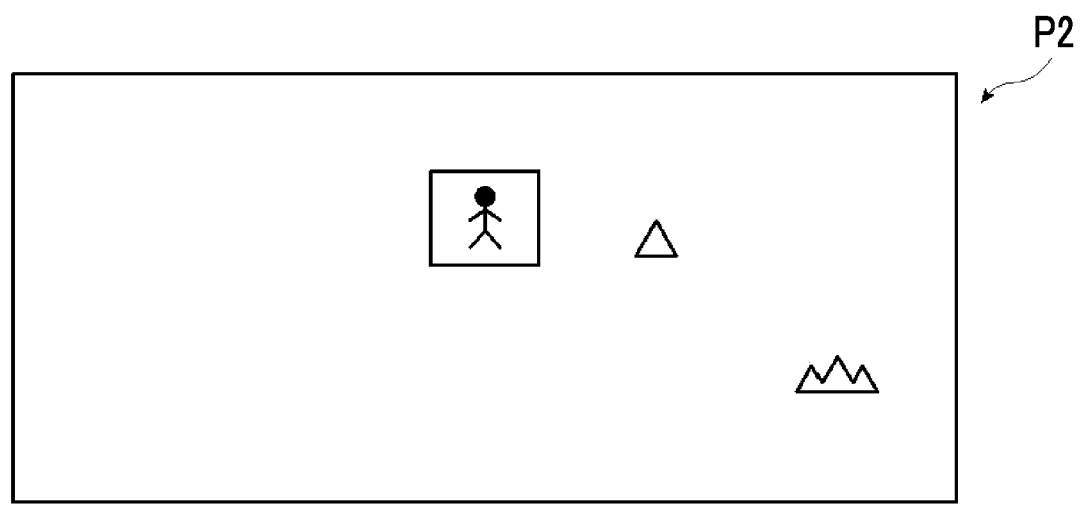
FIG. 9 is a descriptive diagram for a support video.

In addition, the support video P2 is a video including the extraction video P1 as illustrated in FIG. 9. In the first embodiment, the support video P2 is configured with the entire reference video P0 (in a strict sense, the reference video P0 of which a display size is reduced while an aspect ratio is maintained).

In addition, the support video P2 is a video in which a position of the extraction video P1 in the support video P2 is specified. Specifically, the support video P2 is a video in which the extraction video P1 is surrounded by a frame as illustrated in FIG. 9.

An aspect of specifying the position of the extraction video P1 in the support video P2 may be an aspect other than an aspect of surrounding using the frame. For example, an aspect of changing only a display color of the extraction video P1 to a highlighted color in the support video P2, or an aspect of displaying an instruction mark such as a cursor near the extraction video P1 in the support video P2 may be used. In addition, the extraction video P1 may be highlighted by setting a display color of a region other than the extraction video P1 in the support video P2 to be semi-transparent or to a gray color or the like.

In addition, in a case where the extraction range A1 moves during imaging, the position of the extraction video P1 in the support video P2 also changes in connection with the movement. In addition, in a case where the size, the aspect ratio, and the position of the extraction range A1 change during movement, the size, the aspect ratio, and the position of the extraction video P1 in the support video P2 also change in accordance with the setting contents after change.

The support video P2 described so far is generated by the video processing portion 32 as needed during imaging based on the positional relationship between the angle of view A0 and the extraction range A1 and is displayed in the second region on the screen of the display device 40 by the video processing portion 32. At this point, the support video P2 is displayed in a state where a display size can be changed to fall within the second region while the aspect ratio is constantly maintained.

Here, in a case where a general lens is used, the support video P2 has the same aspect ratio as the reference video P0 (that is, the angle of view A0). Meanwhile, in a case where imaging is performed using the anamorphic lens, the reference video P0 is changed to a laterally long video having an aspect ratio of 2.35:1 by extending the reference video P0 in the lateral direction of the angle of view A0, and the reference video P0 is displayed on the display device 40 as the support video P2. An aspect ratio of a display screen of the display device 40 is generally different from an aspect ratio of the support video P2 (for example, 4:3 or 16:9). Thus, in a case where the support video P2 is displayed on the display device 40, spaces (blanks) generally occur in locations adjacent to the support video P2 in an up-down direction of the display screen. The extraction video P1 and the support video P2 can be displayed in balance on the display device 40 at the same time using the spaces.

In the first embodiment, as illustrated in FIG. 4, the support video P2 is displayed at a position immediately above the extraction video P1. However, the present invention is not limited thereto, and the support video P2 may be displayed below the extraction video P1.

Information Such as Setting Contents

The information IF such as the setting contents is information related to at least one of the reference video P0 or the extraction video P1. In the first embodiment, the information IF such as the setting contents is text information related to each of the reference video P0 and the extraction video P1.

The information IF such as the setting contents is displayed on the display device 40 in cooperation between the controller 30 and the video processing portion 32. Specifically, the controller 30 reads out the setting contents, the imaging conditions, and the like from the buffer 250, and the video processing portion 32 displays the information IF such as the setting contents on the display device 40 based on the information read out by the controller 30.

As illustrated in FIG. 10, the information IF such as the setting contents includes the setting contents (in FIG. 10, contents belonging to a category referred to as "at time of setting") for each of the reference video P0 and the extraction video P1, and information (in FIG. 10, information belonging to a category referred to as "at time of imaging") during imaging.

Information displayed as the information IF such as the setting contents is not particularly limited. Examples of the information include the aspect ratio and the number of pixels of the extraction video P1, the position and the area ratio of the extraction range A1, a movement distance of the moving extraction range A1, a distance from an end of the extraction range A1 to an end of the angle of view A0, an estimated time period to when the moving extraction range A1 reaches the end of the angle of view A0, a setting operation method for the extraction range A1, an imaging time period, various imaging conditions (for example, an exposure condition, an f number of a lens, ISO sensitivity, and white balance), the number of pixels (4K, full high definition (HD), or the like) of the extraction region, and a frame rate at a time of motion picture capturing.

The position of the extraction range A1 is a representative position (for example, a center position or positions of four vertices) of the extraction range A1 and is represented as coordinates in a case where a reference position (for example, a position of an upper left vertex of the angle of view A0) set in the angle of view A0 is an origin. For the movement distance of the moving extraction range A1, a total movement distance of the extraction range A1 from a point in time of a start of movement is obtained in units of pixels, and the total movement distance is represented as a relative value (ratio) based on a length of the angle of view A0 in the movement direction. The estimated time period to when the moving extraction range A1 reaches the end of the angle of view A0 is a required time period for movement of the extraction range A1 to the end of the angle of view A0 and is obtained from the distance from the end of the extraction range A1 to the end of the angle of view A0, and the movement speed of the extraction range A1. The setting operation method for the extraction range A1 is information indicating which device is to be operated in the operating part 50 in a ease of setting a "certain content" related to the extraction range A1.

In addition, in a case where the extraction range A1 moves during imaging, the displayed information IF (specifically, the position of the extraction range A1) such as the setting contents changes in connection with the movement. In addition, in a case where the size, the aspect ratio, or the like of the extraction range A1 is changed during movement, the information IF such as the setting contents is updated in accordance with the setting contents after change.

The information IF such as the setting contents is displayed on the display device 40 together with the extraction video P1 and the support video P2 by the video processing portion 32 during imaging. In the first embodiment, as illustrated. in FIG. 4, the information IF such as the setting contents is displayed at a position (for example, a right adjacent position) adjacent to each of the extraction video P1 and the support video P2 in the lateral direction. However, the present invention is not limited thereto. For example, the information IF such as the setting contents may be displayed at a position above or a position below the extraction video P1 or a position above or a position below the support video P2. In addition, a plurality of regions in which the information IF such as the setting contents is displayed may be provided on the screen of the display device 40. Information related to the reference video P0 may be displayed in one of the regions, and information related to the extraction video P1 may be displayed in another region.

Display Method

Figure 11:
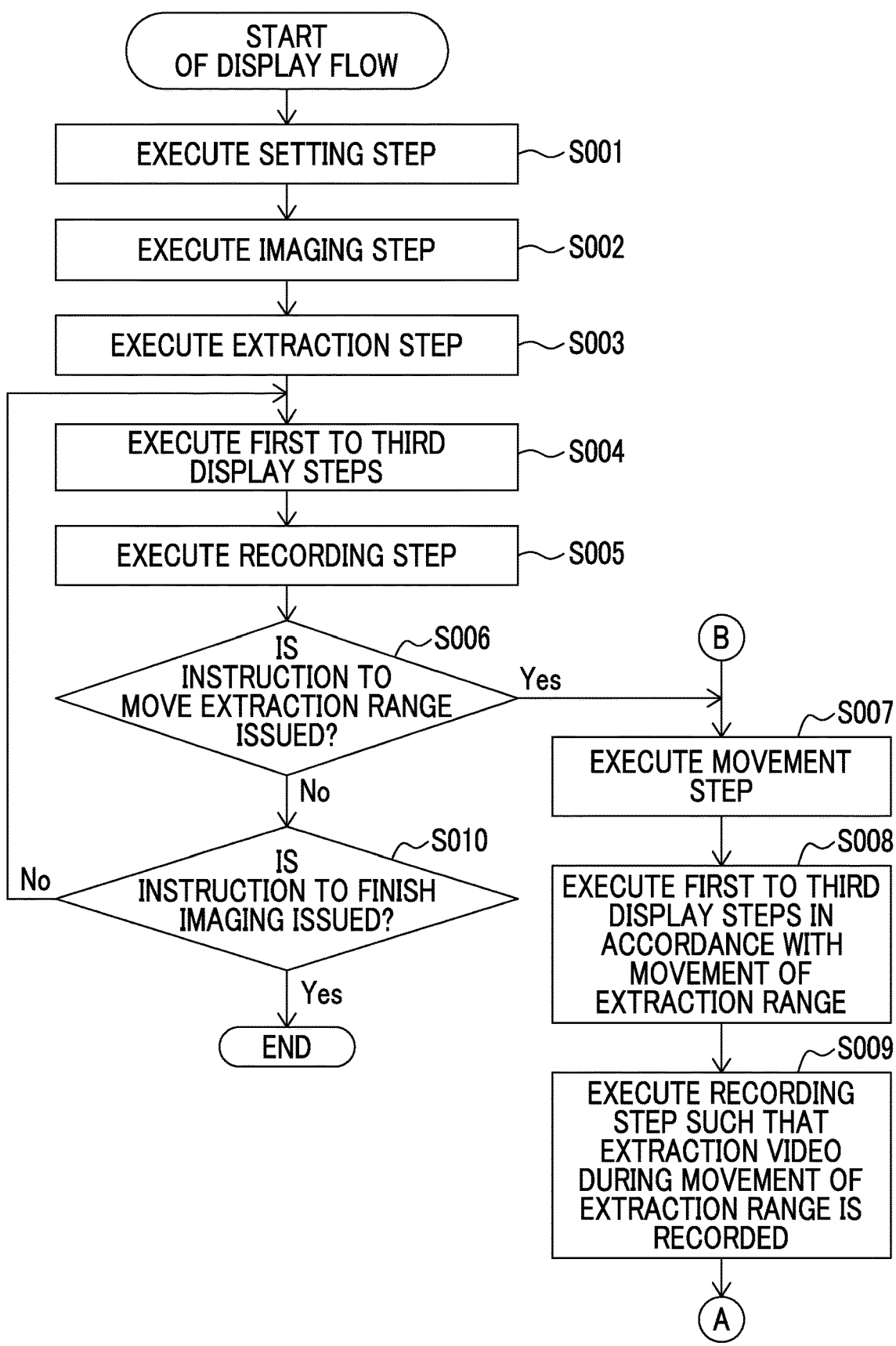
FIG. 11 is a diagram illustrating a processing flow related to the display method according to the first embodiment of the present invention (Part 1).
Figure 12:
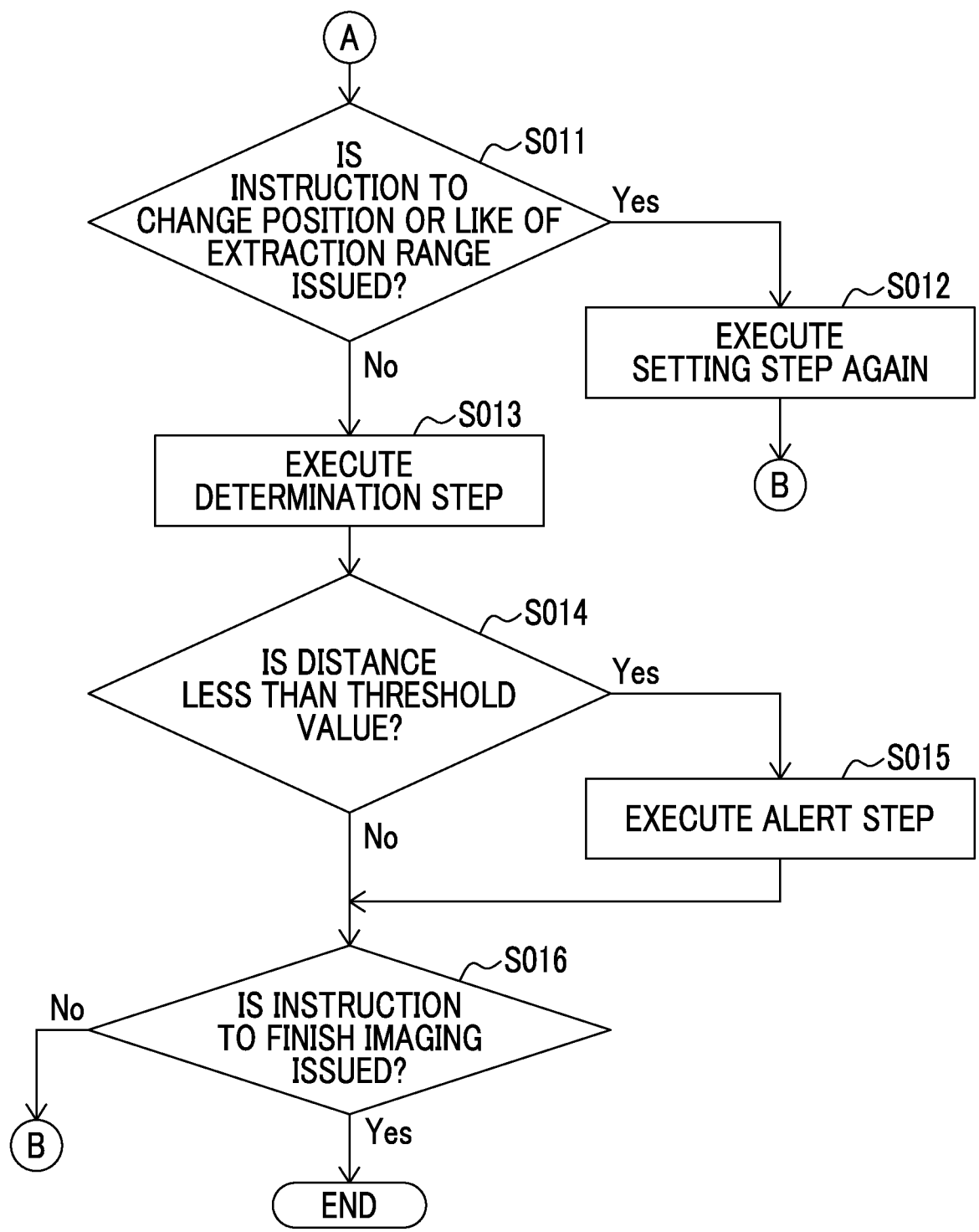
FIG. 12 is a diagram illustrating the processing flow related to the display method according to the first embodiment of the present invention (Part 2).

Next, the display method using the imaging apparatus 10 will be described with reference to FIGS. 11 and 12. FIGS. 11 and 12 illustrate a flow of display flow by the imaging apparatus 10. In the display flow illustrated in FIGS. 11 and 12, a display method according to the embodiments of the present invention is employed. In other words, each step illustrated in FIGS. 11 and 12 corresponds to constituents of the display method according to the embodiments of the present invention. Furthermore, in the display flow, the display method according to the embodiments of the present invention is employed, and a recording step described later is executed. That is, in the display flow, a video recording method according to the embodiments of the present invention is employed.

At a start of the display flow, the user starts the imaging apparatus 10. After the start of the apparatus, the controller 30 executes a setting step (S001). In the setting step, the extraction range A1 is set within the angle of view A0 based on preset initial values or contents of an instruction issued by the user.

Then, the controller 30 starts executing an imaging step by controlling the imaging portion 20 (S002). The imaging step corresponds to an acquisition step of acquiring the reference video P0 that is a motion picture. In the first embodiment, the imaging step is a step of capturing the reference video P0 within the angle of view A0 in a case of using the anamorphic lens.

In a case where the imaging step is executed, the video processing portion 32 executes an extraction step under control of the controller 30 (S003). In the extraction step, the video processing portion 32 extracts a video of the extraction range A1 set in the setting step, that is, the extraction video P1, from the reference video P0.

The video processing portion 32 executes a first display step of displaying the extraction video P1 on the display device 40 and a second display step of displaying the support video P2 on the display device 40 in accordance with extraction of the extraction video P1 (S004). Here, the second display step is executed during execution of the first display step. Accordingly, the extraction video P1 and the support video P2 are displayed on the display device 40 at the same time during imaging.

In a case of capturing the reference video P0 using the anamorphic lens in the imaging step, in the first display step, the extraction video P1 is displayed by extending the size in the lateral direction of the angle of view A0 in a case of using the anamorphic lens. In addition, in the first embodiment, in the first display step, the extraction video P1 is displayed in a state where the display size of the extraction video P1 can be changed while the aspect ratio of the extraction video P1 is constantly maintained.

In addition, in the second display step, the support video P2 in which the position of the extraction video P1 in the support video P2 is specified, specifically, the support video P2 in which the part of the extraction video P1 is surrounded by a frame as illustrated in FIG. 9, is displayed. In a case where the display size of the extraction video P1 is changed, in the second display step, the support video P2 is displayed in a state where a display size of the support video P2 is changed in accordance with the change in display size of the extraction video P1. At this point, it is preferable that the support video P2 is displayed in a state where the display size is changed while the aspect ratio of the support video P2 is constantly set.

Furthermore, in the first embodiment, a third display step of displaying the information IF such as the setting contents on the display device 40 is further executed during execution of both of the first display step and the second display step. Accordingly, the extraction video P1, the support video P2, and the information IF such as the setting contents are displayed on the display device 40 at the same time during imaging.

In a case where the user pushes the release button 310 after extraction of the extraction video P1 is started, execution of the recording step is started based on the push as a trigger (S005). In the recording step, the extraction video P1 is recorded in the internal memory 230 or the memory card 240 as the recording medium by the video processing portion 32. In the first embodiment, a recorded video is limited to only the extraction video P1. Other videos, that is, the reference video P0 and the support video P2, are not recorded and are discarded. Accordingly, a used amount of a recording capacity can be further decreased. However, the present invention is not limited thereto. One or both of the reference video P0 and the support video P2 may be recorded together with the extraction video P1.

In addition, in a case where the user issues an instruction to move the extraction range A1 within the angle of view A0 during execution of the imaging step (S006), a movement step is executed by the video processing portion 32 (S007). In the movement step, the extraction range A1 moves within the angle of view A0 along the movement path corresponding to the mode selected by the user from the tracking mode and the panning mode. More specifically, in a case where the tracking mode is selected, the extraction range A1 is moved within the angle of view A0 such that the subject of the tracking target set by the user enters within the extraction range A1. Meanwhile, in the movement step in a case where the panning mode is selected, the extraction range A1 slides (pans) based on the starting position, the movement direction, and the movement speed set by the user.

In a case where the movement step is executed, the video processing portion 32 executes the first display step, the second display step, and the third display step in accordance with movement of the extraction range A1 (S008). Specifically, in the first display step, the extraction video P1 during movement of the extraction range A1 is displayed. In the second display step, the support video P2 is displayed such that the position of the extraction video P1 in the support video P2 changes. In the third display step, the information IF such as the setting contents is updated and displayed in accordance with movement of the extraction range A1. In step S008, in the same manner as in step S005, the second display step is executed during execution of the first display step, and the third display step is executed during execution of both of the first display step and the second display step.

In addition, in a case where the movement step is executed, the video processing portion 32 executes the recording step such that the extraction video P1 during movement of the extraction range A1 in the movement step is recorded (S009).

Meanwhile, in a case where the instruction of the user for movement of the extraction range A1 is not issued, execution of the first to third display steps and the recording step is repeated until an instruction to finish imaging is issued by the user (S010), and the display flow is finished at a point in time when the instruction to finish imaging is issued. At this point in time, imaging ends, and recording of the extraction video P1 is finished. An operation for issuing the instruction to finish imaging by the user is not particularly limited. For example, an operation of pushing the release button 310 again may be the instruction to finish imaging.

Returning to a processing low in a case where the movement step is executed, in a case where the user issues an instruction to change at least one of the position, the size, the movement speed or the movement direction (hereinafter, referred to as the "position or the like of the extraction range A1") of the extraction range A1 during execution of the movement step (S011), the controller 30 executes the setting step again (S012). In the setting step executed again, the position or the like of the extraction range A1 is set again based on the instruction of the user received during execution of the movement step.

Then, a return is made to step S007, and each of the movement step, the first to third display steps, and the recording step is repeatedly executed. In the movement step after the position or the like of the extraction range A1 is set again, at least one of the position or the like of the extraction range A1 is changed based on the instruction of the user received during execution of the movement step, and then, the extraction range A1 is moved.

In addition, in the first to third display steps (that is, step S008) after the movement step, the extraction video P1, the support video P2, and the information IF such as the setting contents based on the extraction range A1 of which the position or the like is changed are displayed on the display device 40. Specifically, in the first display step, the extraction video P1 after the position or the like of the extraction range A1 is changed is displayed. In the second display step, the support video P2 in which the position of the extraction video P1 in the support video P2 is a position after change is displayed. In the third display step, the information IF such as the setting contents is Updated and displayed in accordance with the change in position or the like of the extraction range A1.

In addition, in a case where the movement step is executed, the video processing portion 32 appropriately executes a determination step (S013). The determination step is executed during execution of the movement step. In the determination step, a determination as to whether or not the distance between the end of the angle of view A0 and the end of the extraction range A1 (in a strict sense, an end on a side approaching the end of the angle of view A0) is less than a threshold value is performed.

In a case where a determination that the distance is less than the threshold value is made in the determination step (S014), the video processing portion 32 executes an alert step (S015) and issues an alert to the user. Accordingly, the user can be prompted to perform an operation for changing the angle of view, the operation for issuing the instruction to finish imaging, or the like by notifying the user that the extraction range A1 approaches near the end of the angle of view. An alert method in the alert step is not particularly limited. For example, examples of the alert method include displaying an alert message on the display device 40 or changing an outer edge frame of the extraction video P1 to a predetermined color (specifically, red or the like).

In a case where the movement step is executed, the series of steps S007 to S015 is repeated until the instruction to finish imaging is issued by the user (S016), and the display flow is finished at a point in time when the instruction to finish imaging is issued. At this point in time, imaging ends, and recording of the extraction video P1 is finished.

As described above, in the video display method according to the first embodiment, the extraction video P1 smaller than the angle of view A0 can be extracted from the reference video P0, and the extraction range A1 can be moved within the angle of view A0. Furthermore, during movement of the extraction range A1, by displaying the extraction video P1 on the display device 40, the user can check the extraction video P1. At this point, it is preferable that the position of the extraction range A1 within the angle of view A0 can be perceived. Therefore, in the first embodiment, the support video P2 as an interface representing the position of the extraction range A1 within the angle of view A0 is displayed on the display device 40 together with the extraction video P1. Accordingly, even in a case where the extraction range A1 moves within the angle of view A0, the user can perceive the position of the extraction range A1 at each point in time during movement. Such an effect is particularly effective in a case where the tracking mode is selected, and the extraction range A1 randomly moves to track a predetermined subject in accordance with a motion of the subject.

In addition, in the first embodiment, in a case where the instruction to change issued by the user is received during execution of the movement step, at least one of the position, the size, the movement speed or the movement direction of the extraction range A1 is changed based on the instruction. In this case, the effect that the user can perceive the position of the extraction range A1 is more remarkably exhibited.

In addition, in the first embodiment, the support video P2 includes the extraction video P1, and the support video P2 is displayed in a state where the position of the extraction video P1 in the support video P2 is specified (for example, a state where the extraction video P1 is surrounded by a frame). Accordingly, the user can more easily perceive the position of the extraction range A1.

In addition, in the first embodiment, information related to at least one of the reference video P0 or the extraction video P1, that is, the information IF such as the setting contents, is displayed on the display device 40 at the same time as the extraction video P1 and the support video P2. Accordingly, the user can check various information indicated by the information IF such as the setting contents and can be notified of more detailed information about the position of the extraction range A1 specified from the support video P2.

Second Embodiment

Figure 13:
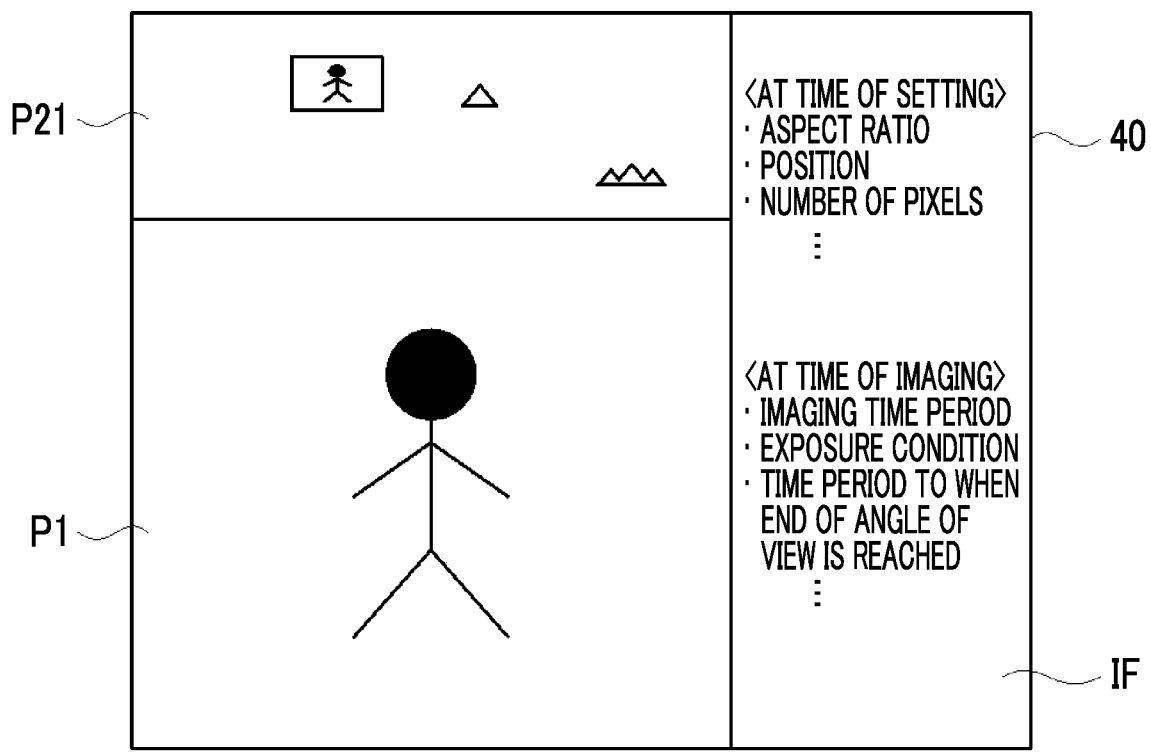
FIG. 13 is a diagram illustrating a screen example of a display device according to a second embodiment of the present invention (Part 1).
Figure 14:
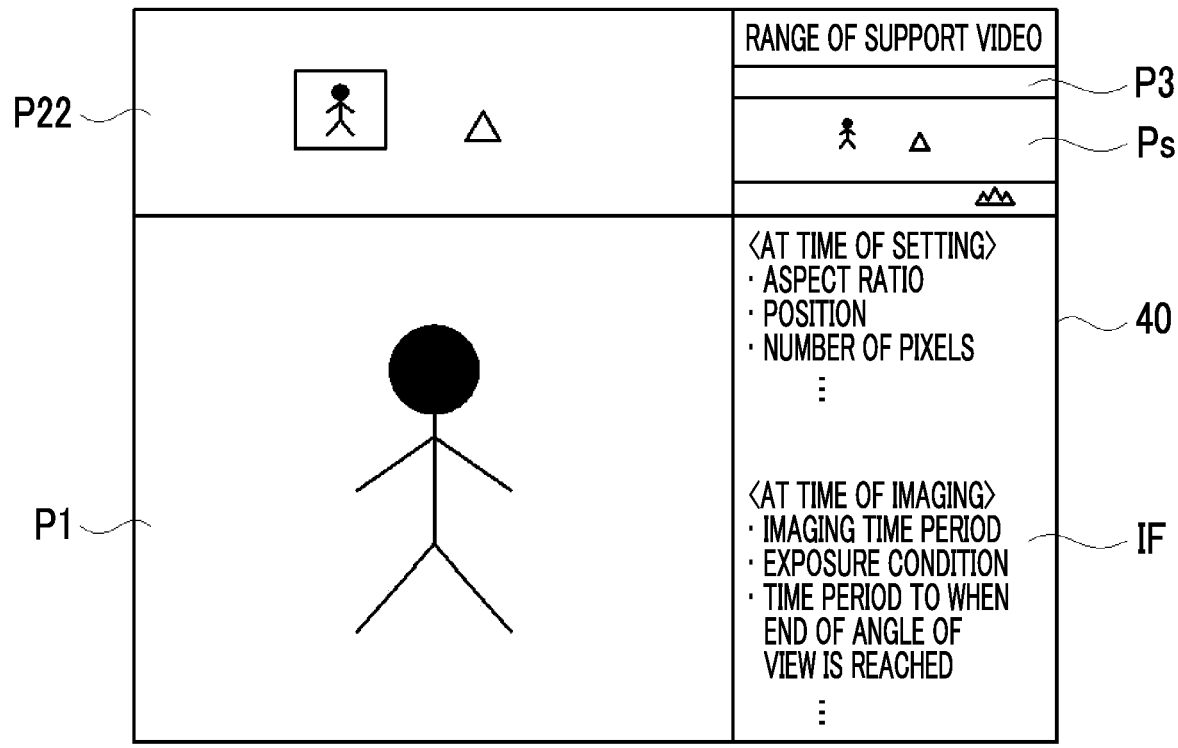
FIG. 14 is a diagram illustrating a screen example of the display device according to the second embodiment of the present invention (Part 2).
Figure 15:
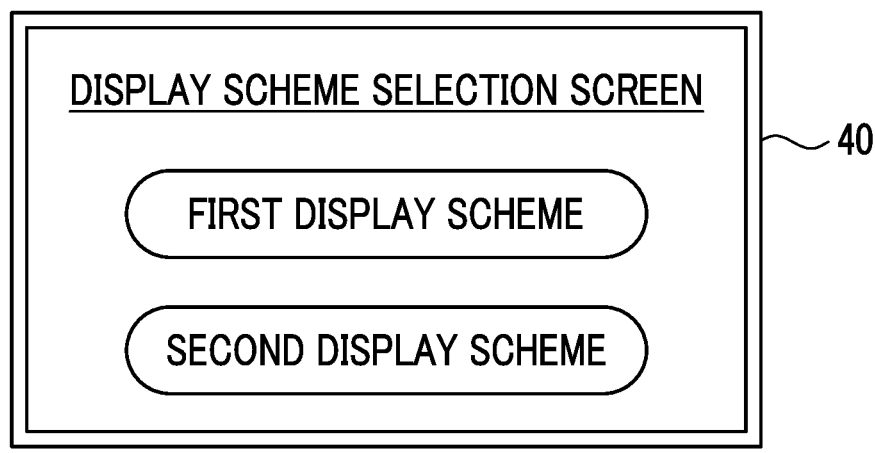
FIG. 15 is a diagram illustrating a display scheme selection screen.

In the first embodiment, the support video P2 is configured with the entire reference video P0. In the second display step, the support video P2 is displayed on the display device 40 in a state where the display size of the support video P2 can be changed. Alternatively, a form of displaying a support video different from the support video P2 according to the first embodiment, for example, support videos P21 and P22 illustrated in FIGS. 13 and 14, may be considered. Hereinafter, this form will be described as a second embodiment with reference to FIGS. 13 to 15. Here, FIGS. 13 and 14 illustrate screen examples of the display device 40 in the second embodiment and correspond to FIG. 4.

Hereinafter, items different from the first embodiment in the second embodiment will be mainly described. In addition, the same elements as the first embodiment among elements illustrated in FIGS. 13 and 14 will be designated by the same reference numerals as in the first embodiment.

In the second embodiment, the user selects any one of two types of display schemes, and the support video is displayed on the display device 40 using the selected display scheme. That is, the second display step in the second embodiment is executed in accordance with the display scheme selected by the user from a first display scheme and a second display scheme. For the display scheme, a selection screen illustrated in FIG. 15 may be displayed on the display device 40, and the user may select the display scheme by, for example, touching one display scheme on the screen.

In a case where the first display scheme is selected, in the second display step, the support video P21 configured with the entire reference video P0 is displayed on the display device 40. An aspect ratio and a display size of the support video P21 can be changed.

In other words, in the second display step in a case where the first display scheme is selected, the support video P21 can be displayed in a state where the aspect ratio and the display size of the support video P21 can be changed. For example, as illustrated in FIG. 13, the support video P21 of which the display size is reduced by squeezing the support video P21 in a vertical direction can be displayed. Accordingly, in a case where the first display scheme is selected, a degree of freedom in display of the support video P21 is increased, compared to the first embodiment. That is, in the second display step in a case where the first display scheme is employed, the support video P21 can be displayed in a state where the aspect ratio and the display size of the support video P21 are changed in accordance with the change in display size of the extraction video P21. For example, in a case where a region in which the extraction video P1 is displayed on the display screen of the display device 40 is increased, the aspect ratio and the display size of the support video P21 can be freely changed in accordance with an extra space in order to display the support video P21 in the space.

In the second display step in a case where the second display scheme is selected, the support video P22 configured with a video of a part of the reference video P0 is displayed on the display device 40. The support video P22 is displayed in a state where the display size can be changed while the aspect ratio is constantly maintained. That is, in the second display step in a case where the second display scheme is selected, the support video P22 can be displayed in a state where the display size is changed while the aspect ratio is constantly maintained, in accordance with the change in display size of the extraction video P1.

Furthermore, in a case where the second display scheme is selected, the user can freely designate a range of the support video P22 (specifically, a range displayed as the support video P22) in the reference video P0 and freely change the designated range by, for example, operating the operating part 50. That is, in the second display step in a case where the second display scheme is selected, it is possible to display the support video P22 while moving the range of the support video P22 in the reference video P0.

Examples of a method of designating the range of the support video P22 in the reference video P0 include various methods such as a button operation or a touch panel operation. In the second embodiment, a method using an auxiliary video Ps described later is used.

As described above, in a case where the second display scheme is selected, as illustrated in FIG. 14, a video of the range designated by the user in the reference video P0 can be set as the support video P22, and it is possible to change the display size of the support video P22 while maintaining the aspect ratio of the support video P22. For example, in the reference video P0, only a necessary range necessary to be displayed as the support video P22 is designated, and then, the display size of the support video P22 is appropriately adjusted. By doing so, a display space of the support video P22 on the display device 40 can be further decreased.

In addition, in a case where the second display scheme is selected, as illustrated in FIG. 14, a range instruction video P3 that is a video indicating the range of the support video P22 in the reference video P0 is displayed on the display device 40 together with the extraction video P1 and the support video P22. The range instruction video P3 is configured with the reference video P0 that is reduced, and the auxiliary video Ps displayed in a superimposed manner on the reference video P0. The auxiliary video Ps indicates a part of the reference video P0 corresponding to the support video P22. The range of the support video P22 in the reference video P0 can be perceived by visually recognizing the auxiliary video Ps.

In addition, the user can move the auxiliary video Ps by, for example, performing a touch-and-drag operation on the screen. By moving the auxiliary video Ps, the range of the support video P22 in the reference video P0 can be changed.

In a case where the second display scheme is selected, a step (hereinafter, referred to as a fourth display step) of displaying the range instruction video P3 is executed in addition to the first to third display steps during execution of all of the first to third display steps. That is, in the second display scheme, all of the extraction video P1, the support video P22, the information IF such as the setting contents, and the range instruction video P3 are displayed on the display device 40 at the same time.

As described above, in a case where the second display scheme is selected, the user can freely decide the range of the support video P22 by operating the auxiliary video Ps. In addition, by checking the support video P22 and the range instruction video P3, the position of the extraction range A1 within the angle of view A0 can be perceived.

In a case where the second display scheme is selected, displaying the range instruction video P3 (that is, executing the fourth display step) may not be necessary. The range instruction video P3 may not be displayed, and only the support video P22 may be displayed.

Third Embodiment

In the first embodiment, all of the extraction video P1, the support video P2, and the information IF such as the setting contents are displayed on the same display device 40 of the imaging apparatus 10. Alternatively, a form of displaying the extraction video P1 and the support video P2 on display devices different from each other may be considered. Hereinafter, this form will be described as a third embodiment with reference to FIGS. 16 to 18. Hereinafter, items different from the first embodiment in the third embodiment will be mainly described. In addition, the same elements as the first embodiment among elements illustrated in FIG. 16 will be designated by the same reference numerals as in the first embodiment.

Figure 16:
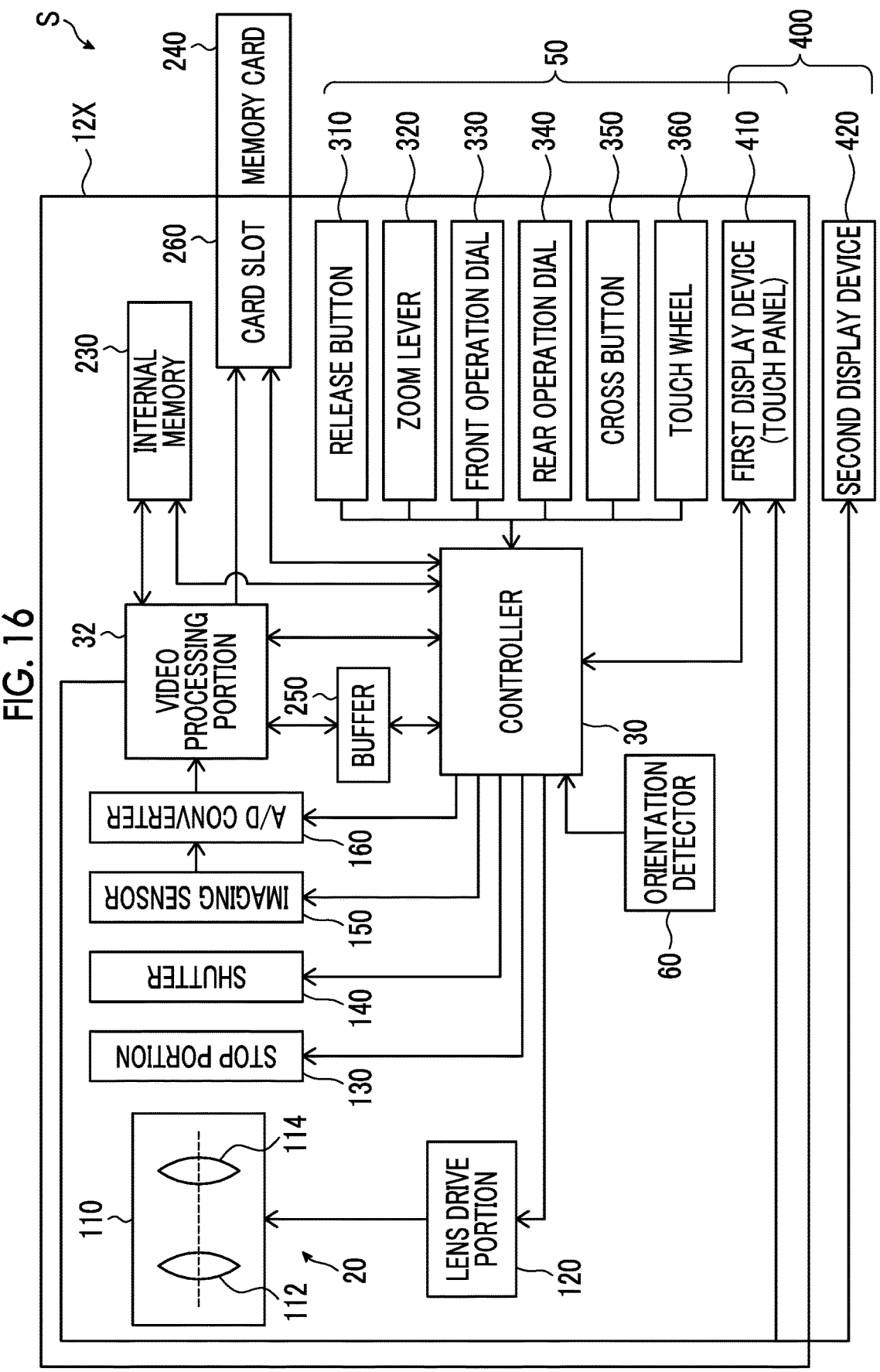
FIG. 16 is a diagram illustrating a configuration of an imaging system used in a display method according to a third embodiment of the present invention.

The third embodiment relates to a display method using an imaging system S illustrated in FIG. 16. That is, the display method according to the third embodiment of the present invention is implemented by the imaging system S. The imaging system S is configured with an imaging apparatus 10X and an external monitor. As illustrated in FIG. 16, a basic configuration of an imaging apparatus main body 12X according to the third embodiment is approximately the same as the basic configuration of the imaging apparatus main body 12 according to the first embodiment.

Meanwhile, the imaging apparatus main body 12X according to the third embodiment comprises a first display device 410 configured with a touch panel display or the like and is connected to a second display device 420 that is the external monitor. The second display device 420 is configured with a display device such as a liquid crystal monitor, a recorder including a monitor, an information processing terminal including a monitor, such as a laptop personal computer, a smartphone, or a tablet terminal, or the like. The imaging apparatus 10X and the second display device 420 according to the third embodiment are connected in a wired manner or a wireless manner.

In the third embodiment, a display device 400 that displays a video includes the first display device 410 and the second display device 420 that are devices separated from each other. In addition, in the third embodiment, the video processing portion 32 of the imaging apparatus transmits video signals to each display device. Accordingly, as illustrated in FIG. 17, the first display device 410 displays the extraction video P1, and the second display device 420 displays the support video P2.

In the third embodiment, a step (that is, the second display step) of displaying the support video P2 on the second display device 420 is executed during execution of a step (that is, the first display step) of displaying the extraction video P1 on the first display device 410. Consequently, even in the third embodiment, the user can more easily perceive the position of the extraction range A1 within the angle of view A0. A video corresponding to the display scheme selected by the user from the two types of support videos P21 and P22 described in the second embodiment may be displayed on the second display device 420.

Figure 17:
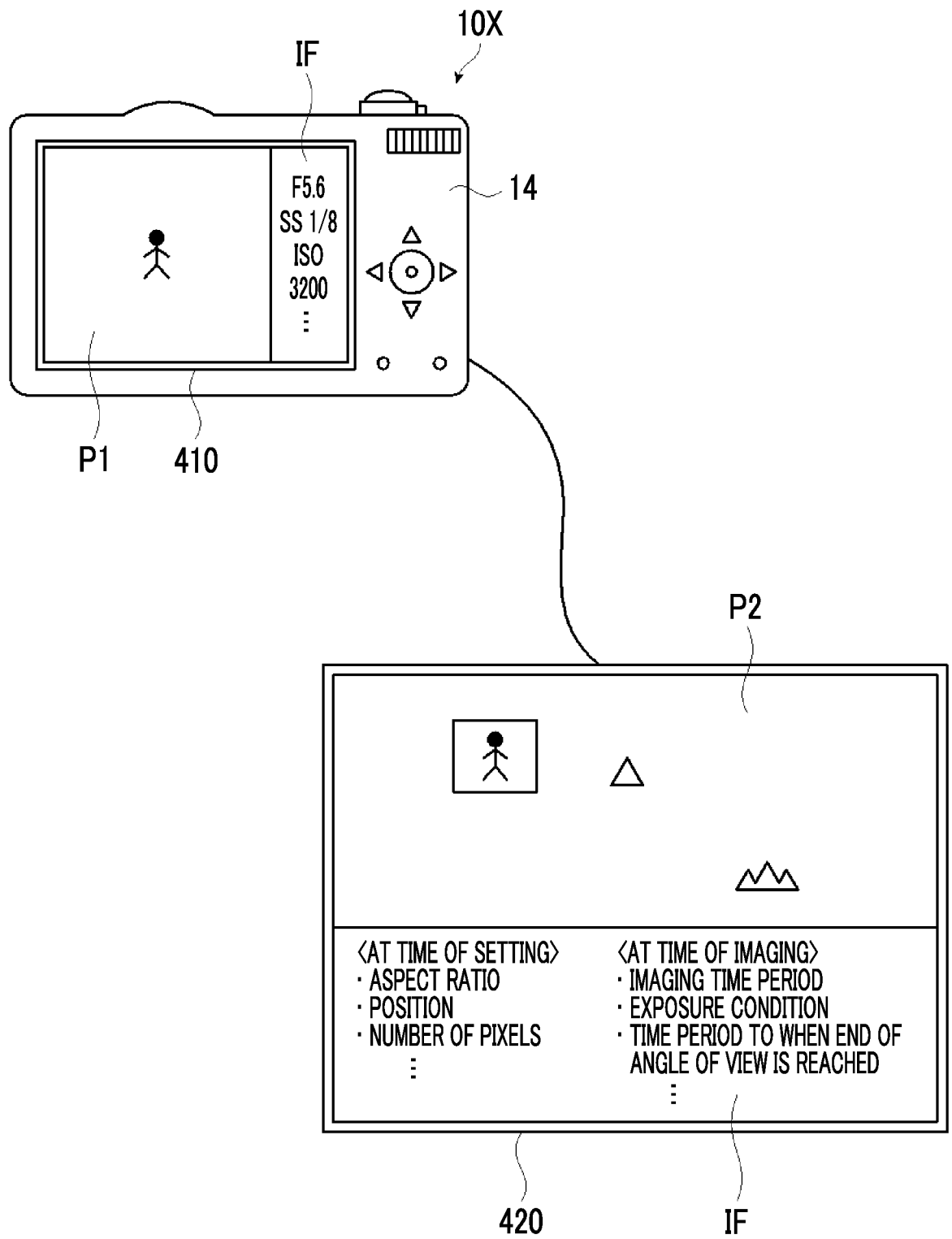
FIG. 17 is a diagram illustrating a screen example of a display device according to the third embodiment of the present invention.

In addition, as illustrated in FIG. 17, the information IF such as the setting contents is displayed on the second display device 420 together with the support video P2. Accordingly, in the third embodiment, a step (that is, the third display step) of displaying the information IF such as the setting contents on the second display device 420 is comprised, and the third display step is executed during execution of both of the first display step and the second display step. A part of the information IF such as the setting contents, for example, the imaging conditions (for example, the exposure condition, the f number of the lens, the ISO sensitivity, and the white balance), may be displayed on the first display device 410 as illustrated in FIG. 17.

In addition, as illustrated in FIG. 16, an orientation detector 60 is mounted in the imaging apparatus main body 12X according to the third embodiment. The orientation detector 60 is configured with, for example, an acceleration sensor. In a case where an orientation of the imaging apparatus 10X changes, for example, in a case where a width and a height of the imaging apparatus 10X are inverted, the orientation detector 60 detects the motion.

Figure 18:
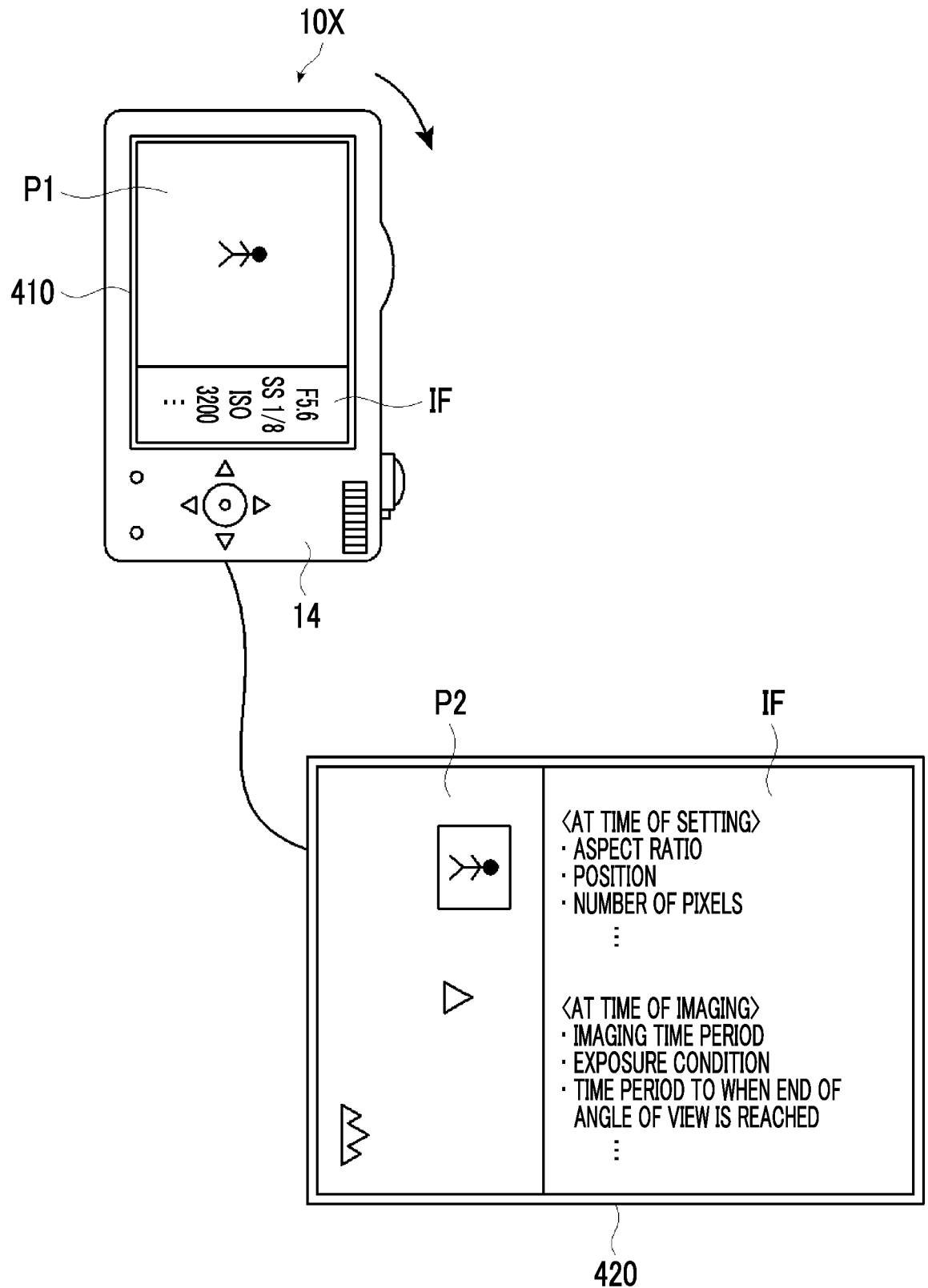
FIG. 18 is a diagram illustrating a screen example of the display device according to the third embodiment of the present invention in a case where a width and a height of the imaging apparatus are inverted.

In the third embodiment, in a case where the user inverts the width and the height of the imaging apparatus 10X during execution of the first display step, that is, during display of the extraction video P1 on the first display device 410, a width and a height of the first display device 410 are inverted, and a display orientation of the extraction video P1 rotates by 90 degrees as illustrated in FIG. 18. In a case where the orientation detector 60 detects this motion, the controller 30 controls the video processing portion 32 in accordance with the detection result. The video processing portion 32 generates the support video P2 of which a width and a height are inverted from a state before the orientation detector 60 detects inversion of the width and the height of the imaging apparatus 10X. The video processing portion 32 transmits the video signals of the support video P2 to the second display device 420. Accordingly, in the second display step, the support video P2 of which the width and the height are inverted as illustrated in FIG. 18 is displayed on the second display device 420. Accordingly, by changing a display orientation of the support video P2 in connection with the change in display orientation of the extraction video P1, the user easily perceives a correspondence relationship between the extraction video P1 and the support video P2 even in a case where the width and the height of the first display device 410 are inverted.

Meanwhile, the information IF such as the setting contents is displayed on the second display device 420. However, as illustrated in FIG. 18, a display orientation of the information IF such as the setting contents does not change even after the orientation detector 60 detects inversion of the width and the height of the imaging apparatus 10X. That is, in the third display step, the information IF such as the setting contents is displayed on the second display device 420 in a state where the display orientation is maintained before and after inversion of the width and the height of the first display device 410. Accordingly, even in a case where the display orientation of the extraction video P1 is inverted between the width and the height, the information IF such as the setting contents that are text information is displayed in a normal orientation. Thus, the user easily checks the information IF such as the setting contents.

Fourth Embodiment

In the first to third embodiments, the video is a motion picture. Here, the motion picture means a collection of a plurality of images (frame images) consecutively captured at a constant frame rate. In the first to third embodiments, the extraction video recorded on the recording medium is a motion picture. Alternatively, the extraction video recorded on the recording medium may be a still picture.

For example, the control portion including the controller 30 and the video processing portion 32 sets a still picture acquired in the acquisition step (specifically, the imaging step) as the reference video P0. As illustrated in FIGS. 4 and 5, the control portion displays the still picture that is the reference video P0 on the display device 40 as the support video P2. In addition, the control portion sets the extraction range A1 corresponding to the subject in the reference video P0 and displays the extraction video P1 captured within the extraction range A1 on the display device 40. In a case where the user executes the recording step by issuing an instruction to perform recording processing, the control portion may execute recording of the still picture instead of capturing the motion picture and record the extraction video P1 that is the still picture on the recording medium such as the memory card 240.

Other Embodiments

While specific embodiments (first to fourth embodiments) of the display method according to the embodiments of the present invention are illustratively described so far, the embodiments are merely an example, and other embodiments are considered.

For example, in the embodiments, the third display step of displaying the information IF such as the setting contents is executed during display of the extraction video P1 and the support video P2 (in other words, during execution of both of the first display step and the second display step). However, the present invention is not limited thereto. The information IF such as the setting contents may not be displayed by not executing the third display step.

In addition, in the embodiments, as the acquisition step of the video, the imaging step of capturing the reference video using the imaging apparatus is executed, and the extraction video smaller than the angle of view of the imaging apparatus is extracted from the captured reference video. However, the present invention is not limited thereto. For example, the acquisition step of the video may be a step of acquiring a video for motion picture editing from an outside as the reference video. Specifically, the reference video may be acquired by downloading a motion picture file of the reference video from an external data distribution apparatus (server). Alternatively, the reference video may be acquired by reading out a video of an editing target from a recording medium on which the motion picture file is recorded.

In addition, in the embodiments, while a digital camera is illustrated as an example of the imaging apparatus, the present invention is not limited thereto. For example, a portable terminal such as a mobile phone including an imaging optical system, a smartphone, and a tablet PC may be used. In addition, the anamorphic lens may be a lens unit externally attached to the imaging optical system of the portable terminal.

EXPLANATION OF REFERENCES 10, 10X: imaging apparatus
12, 12X: imaging apparatus main body
14: housing
20: imaging portion
30: controller
32: video processing portion
40: display device
50: operating part
60: orientation detector
110: lens unit
112: zoom lens
114: focus lens
120: lens drive portion
130: stop portion
140: shutter
150: imaging sensor
160: A/D converter
230: internal memory
240: memory card
250: buffer
260: card slot
310: release button
320: zoom lever
330: front operation dial
340: rear operation dial
350: cross button
360: touch wheel
400: display device
410: first display device
420: second display device
A0: angle of view
A1: extraction range
IF: information such as setting contents
P0: reference video
P1: extraction video
P2, P21, P22: support video
P3: range instruction video
Ps: auxiliary video
S: imaging system

What is claimed is:

1. A display method comprising:
an acquisition step of acquiring a reference video;
an extraction step of extracting an extraction video set to be smaller than an angle of view of the reference video within the angle of view from the reference video;
a movement step of moving an extraction range of the extraction video over time;
a first display step of displaying the extraction video on a display device; and
a second display step of displaying a support video based on a positional relationship between the angle of view and the extraction range on the display device,
wherein the second display step is executed during execution of the first display step,
the display device includes a first display device and a second display device that are devices separated from each other,
the first display device displays the extraction video on the first display device,
the second display device displays the support video on the second display device,
the display method further comprises a third display step of displaying text information related to at least one of the reference video or the extraction video on the second display device,
the third display step is executed during execution of both of the first display step and the second display step, and
in a case where a width and a height of the first display device are inverted during the first display step, the support video of which a width and a height are inverted is displayed on the second display device in the second display step, and the text information of which a display orientation is maintained is displayed on the second display device in the third display step.

2. The display method according to claim 1,
wherein the support video includes the extraction video, and
in the second display step, the support video in which a position of the extraction video in the support video is specified is displayed.

3. The display method according to claim 1, further comprising:
a third display step of displaying information related to at least one of the reference video or the extraction video on the display device,
wherein the third display step is executed during execution of both of the first display step and the second display step.

4. The display method according to claim 1,
wherein in the first display step, the extraction video is displayed in a state where a display size of the extraction video is changeable, and
in the second display step, the support video is displayed in a state where an aspect ratio of the support video and a display size of the support video are changeable.

5. The display method according to claim 4,
wherein in the first display step, the extraction video is displayed in a state where the display size of the extraction video is changeable while an aspect ratio of the extraction video is constantly maintained, and
in the second display step, the support video is displayed in a state where the display size of the support video is changed in accordance with a change in display size of the extraction video.

6. The display method according to claim 4,
wherein in the second display step, the support video indicating a video of a part of the reference video is displayed in a state where the display size of the support video is changed while the aspect ratio of the support video is constantly maintained, in accordance with a change in display size of the extraction video.

7. The display method according to claim 1,
wherein the second display step is executed in accordance with a display scheme selected by a user from a first display scheme and a second display scheme,
in a case where the first display scheme is selected, in the second display step, the support video is displayed in a state where an aspect ratio of the support video and a display size of the support video are changeable, and
in a case where the second display scheme is selected, in the second display step, the support video indicating a video of a part of the reference video is displayed in a state where the display size of the support video is changeable while the aspect ratio of the support video is constantly maintained.

8. The display method according to claim 1,
wherein the acquisition step is an imaging step of capturing the reference video within the angle of view.

9. The display method according to claim 8,
wherein in the imaging step, the reference video is captured within the angle of view using an anamorphic lens, and
in the first display step, the extraction video is displayed by extending a size in a lateral direction of the angle of view using the anamorphic lens.

10. The display method according to claim 8,
wherein the movement step is executed during execution of the imaging step, and
in the movement step, at least one of a position, a size, a movement speed, or a movement direction of the extraction range is changed based on an instruction of a user received during execution of the movement step.

11. The display method according to claim 1,
wherein in the movement step, the extraction range is moved within the angle of view such that a subject of a tracking target set by a user enters within the extraction range.

12. The display method according to claim 1, further comprising:
a determination step of determining whether or not a distance between an end of the angle of view and an end of the extraction range is less than a threshold value during execution of the movement step; and
an alert step of issuing an alert to a user in a case where the distance is less than the threshold value.

13. The display method according to claim 2, further comprising:
a third display step of displaying information related to at least one of the reference video or the extraction video on the display device,
wherein the third display step is executed during execution of both of the first display step and the second display step.

14. The display method according to claim 2,
wherein in the first display step, the extraction video is displayed in a state where a display size of the extraction video is changeable, and
in the second display step, the support video is displayed in a state where an aspect ratio of the support video and a display size of the support video are changeable.

15. The display method according to claim 14,
wherein in the first display step, the extraction video is displayed in a state where the display size of the extraction video is changeable while an aspect ratio of the extraction video is constantly maintained, and
in the second display step, the support video is displayed in a state where the display size of the support video is changed in accordance with a change in display size of the extraction video.

16. The display method according to claim 14,
wherein in the second display step, the support video indicating a video of a part of the reference video is displayed in a state where the display size of the support video is changed while the aspect ratio of the support video is constantly maintained, in accordance with a change in display size of the extraction video.

17. The display method according to claim 2,
wherein the second display step is executed in accordance with a display scheme selected by a user from a first display scheme and a second display scheme,
in a case where the first display scheme is selected, in the second display step, the support video is displayed in a state where an aspect ratio of the support video and a display size of the support video are changeable, and
in a case where the second display scheme is selected, in the second display step, the support video indicating a video of a part of the reference video is displayed in a state where the display size of the support video is changeable while the aspect ratio of the support video is constantly maintained.

18. The display method according to claim 2,
wherein the acquisition step is an imaging step of capturing the reference video within the angle of view.

19. The display method according to claim 18,
wherein in the imaging step, the reference video is captured within the angle of view using an anamorphic lens, and
in the first display step, the extraction video is displayed by extending a size in a lateral direction of the angle of view using the anamorphic lens.

20. A video recording method employing the display method according to claim 1, the video recording method comprising:
a recording step of recording the extraction video on a recording medium.

* * * * *